Oct. 27, 1925.
C. J. MANUEL
1,558,695
ADJUSTABLE RELEASE VALVE
Filed May 24, 1924
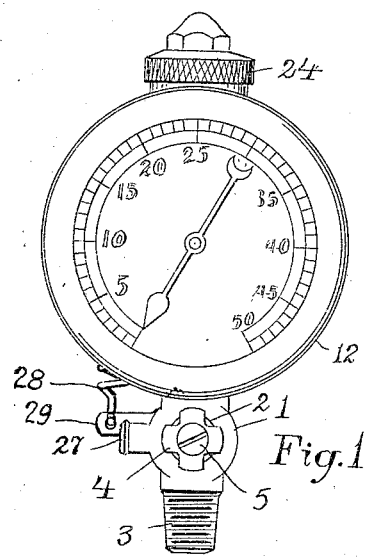
Fig.1
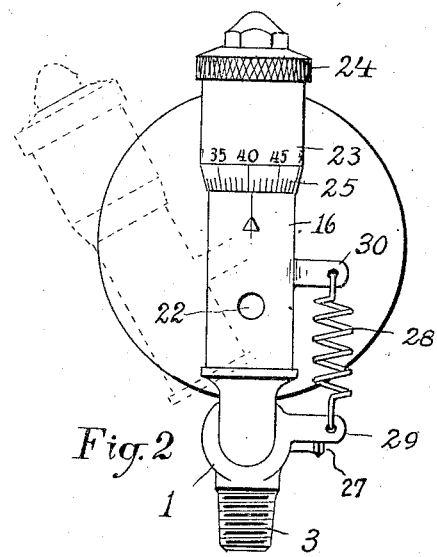
Fig.2
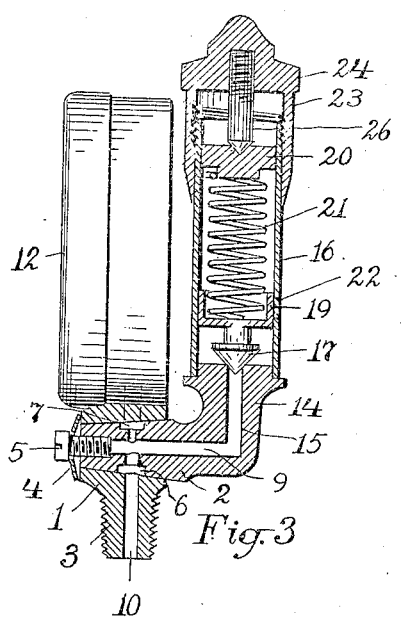
Fig.3
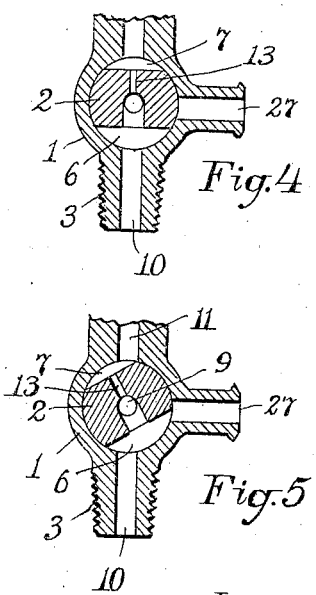
Fig.4
Fig.5
Inventor,
Charles J. Manuel;
By H. B. Upham,
Attorney.

Patented Oct. 27, 1925.

1,558,695

UNITED STATES PATENT OFFICE.

CHARLES J. MANUEL, OF ELMSFORD, NEW YORK.

ADJUSTABLE RELEASE VALVE.

Application filed May 24, 1924. Serial No. 715,663.

*To all whom it may concern:*

Be it known that I, CHARLES J. MANUEL, a citizen of the United States, and a resident of Elmsford, in the county of Westchester and State of New York, have invented certain new and useful Improvements in Adjustable Release Valves, of which the following is a full, clear, and exact specification.

The object of my invention is the construction of a single device combining a shut-off, an adjustable release valve and a pressure gauge, designed both for a compressed air container, for controlling the inflation of balloon tires and for kindred purposes.

In the drawings forming part of this specification, Fig. 1 is a front elevation of a device embodying my improvements. Fig. 2 is a back view of the same. Fig. 3 is a side elevation thereof, mainly in section. Fig. 4 is a sectional detail view of the valve, showing the same in its closed position. Fig. 5 is a similar view but showing it open.

The valve body 1 has a cock 2 turning therein, and a screw plug 3 to be screwed into the wall of the container holding compressed air or other gas. The cock is retained in the body 1 by a cruciform spring washer 4 and a screw 5, and is formed with transverse notches 6 and 7, as shown in Figs. 4 and 5, and an axially disposed hole 9, the plug 3 having a vertical hole 10 disposed to communicate with the under notch 6, while notch 7 communicates with a hole 11 leading to the pressure indicator 12. A small hole 13 opens from the hole 9 to the notch 7, as shown in Figs. 4 and 5.

The cock 2 is formed with an elbow 14 having a conduit 15 opening from the hole 9, and a sleeve 16 within which is a conical plug 17 for closing the conduit 15. This plug is carried by a cup 19 slidably fitting within the sleeve or cylinder 16, between which and a disk 20 in the upper part of the cylinder is a helical spring 21 for yieldingly pressing the plug 17 into the mouth of the conduit 15.

Through the wall of the cylinder is an opening 22 for the escape of any gas forcing its way through the conduit 15 with a pressure exceeding that of the spring 21.

About the upper portion of the cylinder 16 and engaging a screw thread thereon is a cap 23 having a knurled portion 24 for its easy manipulation, and indicator markings about its chamfered lower edge, as at 25. Within the cap is a pin 26 abutting against the upper surface of the disk 20, which may be threaded into the cap for adjustment purposes, whereby the rotation of the cap causes the disk 20 to be raised or lowered within the cylinder 16 and the spring 21 to be varied in pressure accordingly.

At one side of the body 1 is a nipple 27 which is normally closed, as shown in Fig. 4, when the cylinder 16 is vertical. When, however, the cylinder is drawn forward as indicated in dotted lines in Fig. 2, and brings the cock 2 to the position illustrated in Fig. 5, then the contents of the receptacle, whether compressed air or other gas, pass up through the bore of the plug 3 to the notch 6 and thence out through the nipple 27, through the rubber tube attached thereto and thence to any point desired.

A tension spring 28 attached at its ends to an arm 29 projecting from the body 1 and an arm 30 projecting from the cylinder 16, serves to return the latter to its normal position.

The pressure gage 12 is mainly used for checking up purposes, but for inflating a tire, the pop-valve 19 is relied upon. In doing this filling, the cock 2 is turned in the direction indicated by the dotted lines of the part 16 to a farther degree than shown in Fig. 2, and until the inlet through the channel 10 is nearly closed, thus so reducing the pressure from the tank that the tire and the pop valve will both have a reduced but equal pressure.

As soon, however, as the tire is filled the pressure in it and the pop valve will at once mount up until the pop valve 19 rises against the pressure of its spring 21 and uncovers the hole 22. This prevents further increase in pressure in the tire, and at the same time the whistle of the air escaping through the hole 22 notifies the attendant, and he at once swings the part 16 back to normal, or releases it and permits its spring 28 to return it. This shuts off further admission of air to the tire, and, by allowing the spring 28 to continue the swing of the part 16 toward the right, until the cock 2 is so far beyond its position illustrated in Fig. 4 as to present its unbroken portion wholly over the intake 10, no more air can come from the filling-tank. This last position will put the port 27 and hence the gage 12 into communication with each other and the latter with the filled tire to show whether or not the tire has in fact been inflated to the desired degree. This same fact can also be determined before the tire has received sufficient air to operate the pop valve, in like manner.

What I claim as my invention is:

1. A unitary device for controlling the transmission of a compressed gas from one container to another, comprising a valve body having nipples adapted for connection with said containers, a cock in said body having an elbow, a safety valve carried by said elbow, a tension spring and arms for holding said safety valve normally in a vertical position, said safety valve and nipples being in communication with and controlled by said cock, whereby said safety valve being swung forward acts to open said cock to permit communication between said nipples, and being released, said spring returns the said cock to its normal closed condition.

2. The combination of a valve body having a threaded plug for screwing into engagement with a compressed gas container, a cock turning in said body having an elbow, a safety valve carried by said elbow and communicating with said cock, a pressure gauge communicating with said cock, said cock having a nipple taking the compressed gas through said valve, the latter having a longitudinal bore, a notch in its normally under surface, a notch in its normally upper surface, and holes from said notches to said bore.

In testimony that I claim the foregoing invention, I have hereunto set my hand this 16th day of May, 1924.

CHARLES J. MANUEL.